(12) United States Patent
Kim et al.

(10) Patent No.: US 11,036,305 B2
(45) Date of Patent: *Jun. 15, 2021

(54) SIGNAL PROCESSING APPARATUS AND SIGNAL PROCESSING METHOD

(71) Applicant: SONY CORPORATION, Tokyo (JP)

(72) Inventors: Heesoon Kim, Kanagawa (JP); Masaharu Yoshino, Saitama (JP); Tatsushi Nashida, Kanagawa (JP); Masahiko Inami, Kanagawa (JP); Kouta Minamizawa, Tokyo (JP); Yuta Sugiura, Tokyo (JP); Yusuke Mizushina, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/892,843

(22) Filed: Jun. 4, 2020

(65) Prior Publication Data

US 2020/0301516 A1     Sep. 24, 2020

Related U.S. Application Data

(63) Continuation of application No. 15/761,626, filed as application No. PCT/JP2016/079866 on Oct. 6, 2016, now Pat. No. 10,705,620.

(30) Foreign Application Priority Data

Oct. 9, 2015    (JP) .................. 2015-200899

(51) Int. Cl.
*G06F 3/01*    (2006.01)
*G10H 1/043*    (2006.01)
(Continued)

(52) U.S. Cl.
CPC .............. *G06F 3/017* (2013.01); *G06F 3/167* (2013.01); *G10H 1/00* (2013.01); *G10H 1/0091* (2013.01);
(Continued)

(58) Field of Classification Search
None
See application file for complete search history.

(56) References Cited

U.S. PATENT DOCUMENTS

| 10,705,620 B2* | 7/2020 | Kim .................... G10H 1/00 |
| 2001/0021905 A1* | 9/2001 | Burnett ............ A61B 5/0507 |
| | | 704/233 |

(Continued)

FOREIGN PATENT DOCUMENTS

| JP | 2002-341865 A | 11/2002 |
| JP | 2005-301912 A | 10/2005 |
| JP | 2010-021854 A | 1/2010 |

OTHER PUBLICATIONS

Non-Final Office Action for U.S. Appl. No. 15/761,626, dated Nov. 2, 2018, 14 pages.
(Continued)

*Primary Examiner* — Antim G Shah
(74) *Attorney, Agent, or Firm* — Chip Law Group

(57) ABSTRACT

There is provided a signal processing apparatus that includes a control unit that executes, on a basis of a waveform signal generated in accordance with a motion of an attachment portion of a sensor attached to a tool or a body, effect processing for the waveform signal or another waveform signal, the waveform signal being output from the sensor.

16 Claims, 17 Drawing Sheets

(51) Int. Cl.
*G10H 1/00* (2006.01)
*G10H 1/053* (2006.01)
*G06F 3/16* (2006.01)
*G10L 13/033* (2013.01)
*G10L 21/16* (2013.01)
*H04R 1/04* (2006.01)
*H04R 1/22* (2006.01)

(52) U.S. Cl.
CPC ............ G10H 1/043 (2013.01); G10H 1/053 (2013.01); G10L 13/0335 (2013.01); G10L 21/16 (2013.01); H04R 1/04 (2013.01); H04R 1/222 (2013.01); *G10H 2210/195* (2013.01); *G10H 2210/281* (2013.01); *G10H 2220/201* (2013.01); *G10H 2220/211* (2013.01); *G10H 2220/321* (2013.01); *G10H 2220/351* (2013.01); *G10H 2220/371* (2013.01); *G10H 2220/395* (2013.01)

(56) References Cited

U.S. PATENT DOCUMENTS

| | | | |
|---|---|---|---|
| 2002/0166439 A1* | 11/2002 | Nishitani | G10H 1/0008 84/600 |
| 2005/0233860 A1 | 10/2005 | Inoue | |
| 2008/0205232 A1* | 8/2008 | Matejczyk | H04R 5/02 369/64 |
| 2010/0008516 A1 | 1/2010 | Ichikawa et al. | |
| 2015/0246176 A1* | 9/2015 | Navarro | A61M 5/1413 604/506 |
| 2016/0042666 A1 | 2/2016 | Hughes | |
| 2017/0150255 A1* | 5/2017 | Wang | H04R 3/005 |

OTHER PUBLICATIONS

Non-Final Office Action for U.S. Appl. No. 15/761,626, dated Sep. 9, 2019, 11 pages.
Final Office Action for U.S. Appl. No. 15/761,626, dated May 8, 2019, 10 pages.
Advisory Action for U.S. Appl. No. 15/761,626, dated Aug. 1, 2019, 3 pages.
Notice of Allowance for U.S. Appl. No. 15/761,626, dated Mar. 4, 2020, 11 pages.
International Search Report and Written Opinion of PCT Application No. PCT/JP2016/079866, dated Dec. 20, 2016, 9 pages of English Translation and 8 pages of ISRWO.
International Preliminary Report on Patentability of PCT Application No. PCT/2016/079866, dated Apr. 19, 2018, 9 pages of English Translation and 5 pages of IPRP.
Office Action for JP Patent Application No. 2017-544234 dated Nov. 4, 2020, 4 pages of Office Action and 5 pages of English Translation.

* cited by examiner

FIG. 1
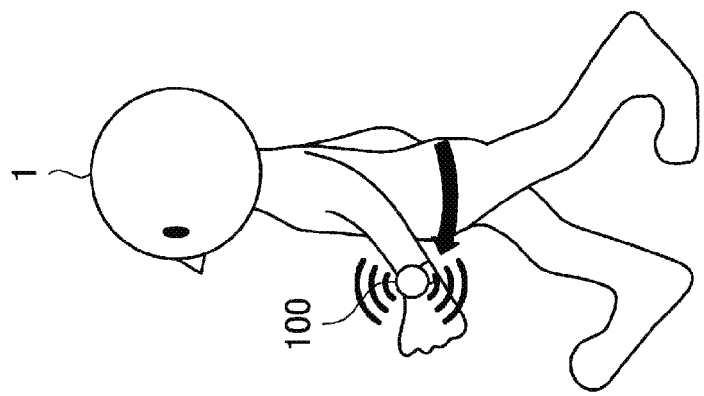
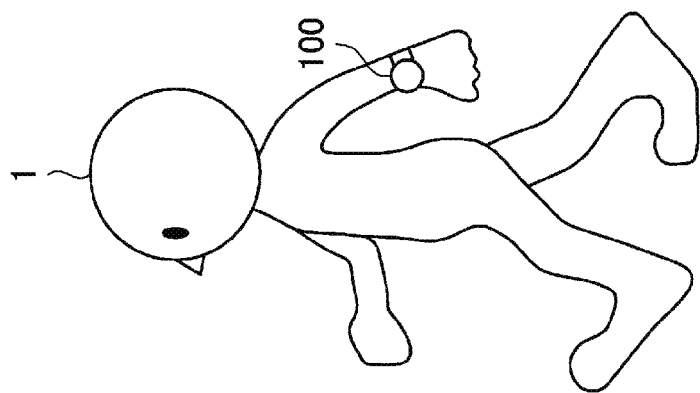

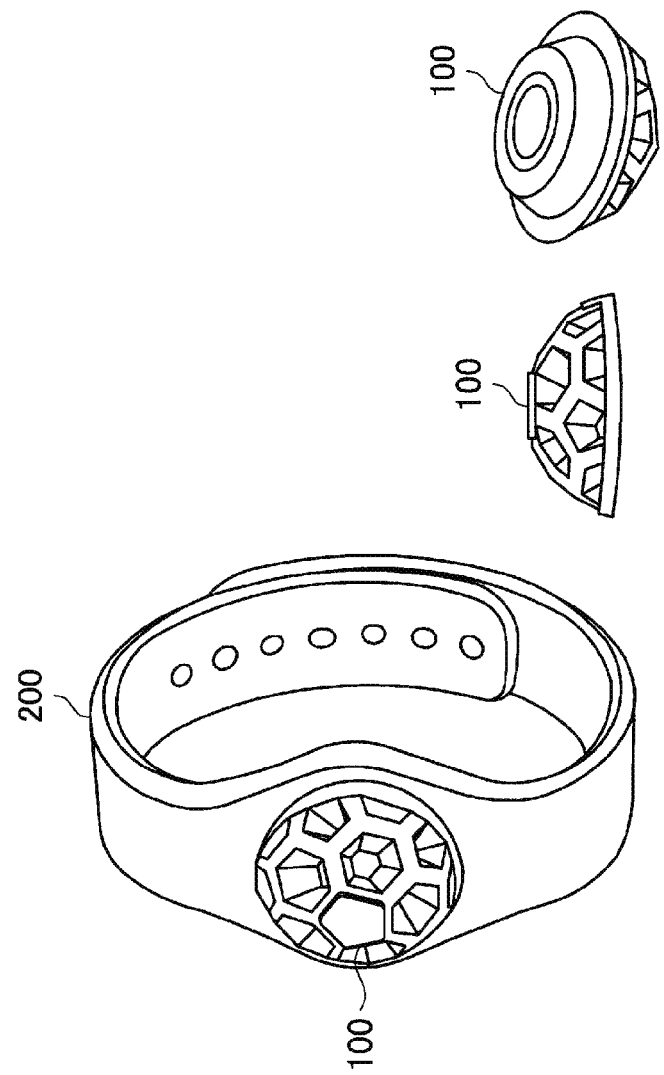

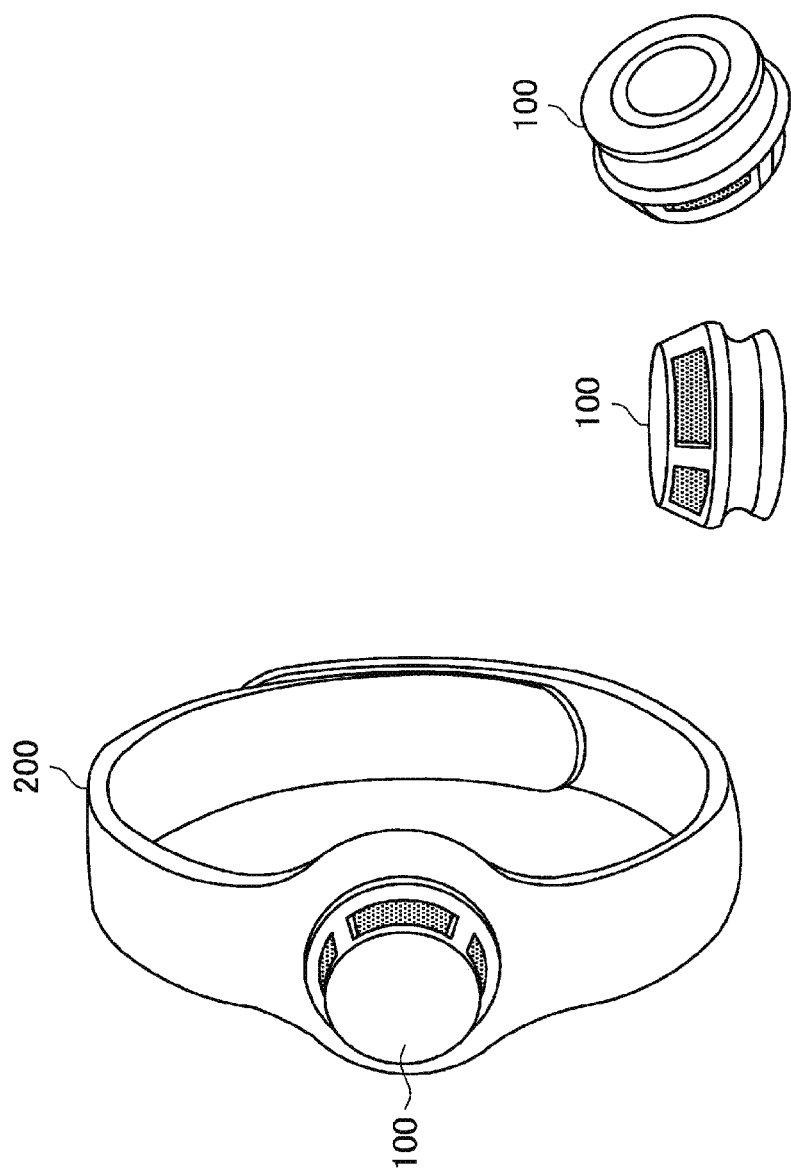

SIGNAL PROCESSING APPARATUS AND SIGNAL PROCESSING METHOD

CROSS-REFERENCE TO RELATED APPLICATIONS

The present application is a continuation application of U.S. patent application Ser. No. 15/761,626, filed Mar. 20, 2018, which is a National Stage of PCT/JP2016/079866, filed Oct. 6, 2016, and claims the benefit of priority from prior Japanese Patent Application JP 2015-200899, filed Oct. 9, 2015, the entire content of which is hereby incorporated by reference.

TECHNICAL FIELD

The present disclosure relates to a signal processing apparatus, a signal processing method, and a computer program.

BACKGROUND ART

For example, Patent Literature 1 discloses a technology of controlling changes in tone and sounds in accordance with a motion of an object. In addition, for example, Patent Literature 2 discloses a technology of realizing sound output that is based on a motion of a user.

CITATION LIST

Patent Literature

Patent Literature 1:JP 2013-228434A
Patent Literature 2:JP 2009-151107A

DISCLOSURE OF INVENTION

Technical Problem

Nevertheless, the technology disclosed in Patent Literature 1 is not a technology of converting a motion of a user itself into a sound, and outputting the resultant sound. Thus, the user cannot aurally feel a user motion itself. In addition, the technology disclosed in Patent Literature 2 requires a sound source for presenting a motion of a body by sound, and is not a technology of aurally presenting the motion itself of the body. Thus, the user cannot aurally feel a user motion itself.

In view of the foregoing, the present disclosure proposes a signal processing apparatus, a signal processing method, and a computer program that are novel and improved, and can perform presentation so that a body motion itself can be aurally felt.

Solution to Problem

According to the present disclosure, there is provided a signal processing apparatus including: a control unit configured to execute, on a basis of a waveform signal generated in accordance with a motion of an attachment portion of a sensor attached to a tool or a body, effect processing for the waveform signal or another waveform signal, the waveform signal being output from the sensor.

In addition, according to the present disclosure, there is provided a signal processing method including: executing, by a processor, on a basis of a waveform signal generated in accordance with a motion of an attachment portion of a sensor attached to a tool or a body, effect processing for the waveform signal or another waveform signal, the waveform signal being output from the sensor.

In addition, according to the present disclosure, there is provided a computer program for causing a computer to execute: executing, on a basis of a waveform signal generated in accordance with a motion of an attachment portion of a sensor attached to a tool or a body, effect processing for the waveform signal or another waveform signal, the waveform signal being output from the sensor.

Advantageous Effects of Invention

As described above, according to the present disclosure, a signal processing apparatus, a signal processing method, and a computer program that are novel and improved, and can perform presentation so that a body motion itself can be aurally felt can be provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram illustrating an overview of a signal processing apparatus according to an embodiment of the present disclosure.

FIG. 11 is an explanatory diagram illustrating an external appearance example of a signal processing apparatus.

FIG. 12 is an explanatory diagram illustrating an external appearance example of a signal processing apparatus.

MODE(S) FOR CARRYING OUT THE INVENTION

Figure 2:
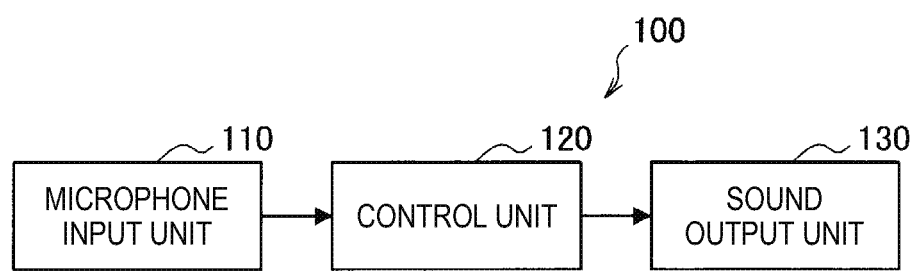
FIG. 2 is an explanatory diagram illustrating a first configuration example of a signal processing apparatus.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be given in the following order.

1. Embodiment of Present Disclosure
1.1. Overview
1.2. First Configuration Example and Operation Example
1.3. Second Configuration Example and Operation Example
1.4. Third Configuration Example and Operation Example
1.5. Fourth Configuration Example and Operation Example
1.6. Fifth Configuration Example and Operation Example
1.7. External Appearance Example
1.8. Application Example
2. Conclusion

1. Embodiment of Present Disclosure

1.1. Overview

First of all, an overview of a signal processing apparatus according to an embodiment of the present disclosure will be described. FIG. 1 is an explanatory diagram illustrating an overview of the signal processing apparatus according to the embodiment of the present disclosure.

The signal processing apparatus according to the embodiment of the present disclosure is an apparatus that can be attached to a portion in a body of a human that has a motion, a sporting tool, or the like. In addition, the signal processing apparatus according to the embodiment of the present disclosure is an apparatus that performs signal processing for a signal generated by a motion of a portion, a tool, or the like to which the apparatus is attached (for example, an aerodynamic sound such as a wind whizzing sound, a sound generated by a human near the portion to which the apparatus is attached), to generate another signal, that is, a sound signal for exaggeratingly representing, by sound, a motion of the portion, the tool, or the like to which the apparatus is attached.

FIG. 1 is an explanatory diagram illustrating a state in which a signal processing apparatus 100 according to the embodiment of the present disclosure is being used. FIG. 1 illustrates a state in which the wristband-type signal processing apparatus 100 is attached to a wrist of a left arm of a user 1.

As illustrated in FIG. 1, if the user 1 swings the left arm back and forth in a state in which the user 1 wears the signal processing apparatus 100 on the wrist of the left arm, the signal processing apparatus 100 collects an aerodynamic sound generated by the backward and forward motions of the left arm of the user 1, and a sound generated by the user 1. The signal processing apparatus 100 then performs signal processing such as amplification and an effect (acoustic effect) on the aerodynamic sound and the sound generated by the user 1 that have been collected, and outputs sounds exaggeratingly representing motions of the left arm. Effect processing can include, for example, echo, reverb, modulation using low-frequency waves, a change in speed (time stretch), a change in musical pitch (pitch shift), and the like. In addition, amplification processing of sounds may also be regarded as one kind of effect processing. In addition, FIG. 1 illustrates a state in which the signal processing apparatus 100 is attached to the wrist of the left arm of the user 1. Nevertheless, it should be appreciated that an attachment position of the signal processing apparatus 100 is not limited to the wrist of the left arm of the user 1, and the signal processing apparatus 100 can be attached to any position other than the wrist of the left arm of the user 1. In addition, FIG. 1 illustrates the wristband-type signal processing apparatus 100. Nevertheless, the form of the signal processing apparatus 100 is not limited to this example, and the signal processing apparatus 100 may have a form to be attached to cloth worn by the user 1, for example.

By performing signal processing such as an effect on a signal generated by a motion of the portion, the tool, or the like to which the apparatus is attached, to generate another signal, that is, a sound signal for exaggeratingly representing, by sound, a motion of the portion, the tool, or the like to which the apparatus is attached, the signal processing apparatus 100 according to the embodiment of the present disclosure enables presentation to be performed so that a body motion itself can be aurally felt. As effect processing, the signal processing apparatus 100 can perform a filter effect such as a lowpass, highpass, and bandpass, and addition synthesis or subtraction synthesis with an oscillator (sine wave, sawtooth wave, triangle wave, rectangular wave, etc.).

For example, the signal processing apparatus 100 can output a motion of the portion, the tool, or the like to which the apparatus is attached, as a loud effect sound as in comics and animations. In addition, for example, the signal processing apparatus 100 can output a sound obtained by expanding claps, footsteps, or a finger snapping sound. In addition, for example, the signal processing apparatus 100 can output a sound obtained by expanding all sounds generated due to the body (hit sound, friction sound, etc.). For example, the signal processing apparatus 100 can output a sound obtained by expanding a sound generated by the user tapping an object, sliding on an object with a hand, rubbing both palms, or sliding a foot.

The overview of the signal processing apparatus according to the embodiment of the present disclosure has been described.

1.2. First Configuration Example and Operation Example

Subsequently, the first configuration example of the signal processing apparatus 100 according to the embodiment of the present disclosure will be described. FIG. 2 is an explanatory diagram illustrating the first configuration example of the signal processing apparatus 100 according to the embodiment of the present disclosure.

As illustrated in FIG. 2, the signal processing apparatus 100 according to the embodiment of the present disclosure includes a microphone input unit 110, a control unit 120, and a sound output unit 130.

The microphone input unit 110 acquires an aerodynamic sound generated by a motion of the portion, the tool, or the like to which the signal processing apparatus 100 is attached, and a sound generated by a human near the portion to which the apparatus is attached. The microphone input unit 110 outputs the acquired sound to the control unit 120 as a sound signal.

The control unit 120 includes, for example, a processor such as a central processing unit (CPU) and a digital signal processor (DSP), a storage medium such as a read only memory (ROM) and a random access memory (RAM), and the like.

The control unit 120 performs signal processing for a sound signal output by the microphone input unit 110, as a waveform signal generated on the basis of a body motion of the user. As signal processing for a sound signal output by the microphone input unit 110, the control unit 120 performs, for example, amplification processing for at least a partial frequency band, predetermined effect processing, or the like. As mentioned above, the amplification processing may also be regarded as one kind of effect processing. If the control unit 120 performs the signal processing on the sound signal output by the microphone input unit 110, the control unit 120 outputs a signal obtained after the signal processing, to the sound output unit 130.

The control unit 120 may set an amplification amount for a sound signal output by the microphone input unit 110, a frequency band used in the amplification, and details of effect processing, to those designated by a user (for example, the user 1), or automatically decide an amplification amount, a frequency band, and details of effect processing. In the case of automatically deciding an amplification amount for a sound signal output by the microphone input unit 110, a frequency band used in the amplification, and details of effect processing, the control unit 120 may decide an amplification amount, a frequency band, and details of effect processing in accordance with, for example, details of a motion of the signal processing apparatus 100, that is, details of a motion of the portion, the tool, or the like to which the signal processing apparatus 100 is attached.

The sound output unit 130 includes, for example, a speaker, and outputs a sound that is based on a signal output from the control unit 120.

By having a configuration as illustrated in FIG. 2, the signal processing apparatus 100 according to the embodiment of the present disclosure can perform signal processing for a signal generated by a motion of the portion, the tool, or the like to which the apparatus is attached, to generate another signal, that is, a sound signal for exaggeratingly representing, by sound, a motion of the portion, the tool, or the like to which the apparatus is attached. By having a configuration as illustrated in FIG. 2, the signal processing apparatus 100 according to the embodiment of the present disclosure enables presentation to be performed so that a body motion itself can be aurally felt, by generating a sound signal for exaggeratingly representing, by sound, a motion of the portion, the tool, or the like to which the apparatus is attached.

Figure 3:
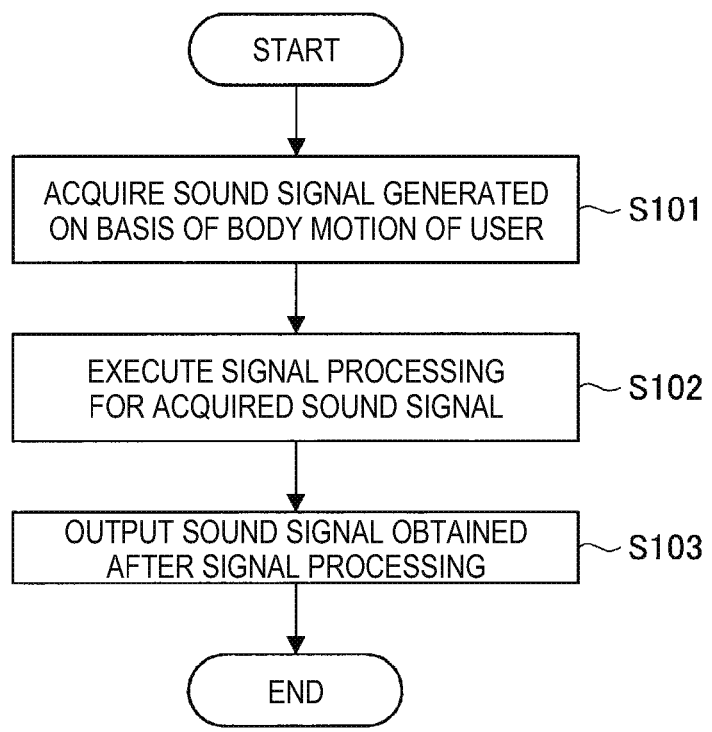
FIG. 3 is a flow chart illustrating a first operation example of the signal processing apparatus.

FIG. 3 is a flow chart illustrating an operation example of the signal processing apparatus 100 according to the embodiment of the present disclosure.

The signal processing apparatus 100 acquires a sound signal generated on the basis of a body motion of the user, as a waveform signal generated on the basis of a body motion of the user (step S101). If the signal processing apparatus 100 acquires the sound signal generated on the basis of the body motion of the user, the signal processing apparatus 100 subsequently executes signal processing for the acquired sound signal (step S102). The signal processing in step S112 is executed by the control unit 120. As signal processing executed in step S102, the signal processing apparatus 100 performs, for example, amplification processing for at least a partial frequency band, predetermined effect processing, or the like.

If the signal processing apparatus 100 executes the signal processing for the sound signal, the signal processing apparatus 100 outputs a sound signal obtained after the signal processing has been executed (step S103). The sound signal obtained after the signal processing has been executed is output from the sound output unit 130 as a sound obtained by expanding a motion of the portion, the tool, or the like to which the signal processing apparatus 100 is attached.

By executing the operations as illustrated in FIG. 3, the signal processing apparatus 100 according to the embodiment of the present disclosure can perform signal processing for a signal generated by a motion of the portion, the tool, or the like to which the apparatus is attached, to generate another signal, that is, a sound signal for exaggeratingly representing, by sound, a motion of the portion, the tool, or the like to which the apparatus is attached. By executing the operations as illustrated in FIG. 3, the signal processing apparatus 100 according to the embodiment of the present disclosure enables presentation to be performed so that a body motion itself can be aurally felt, by generating a sound signal for exaggeratingly representing, by sound, a motion of the portion, the tool, or the like to which the apparatus is attached.

1.3. Second Configuration Example and Operation Example

Figure 4:
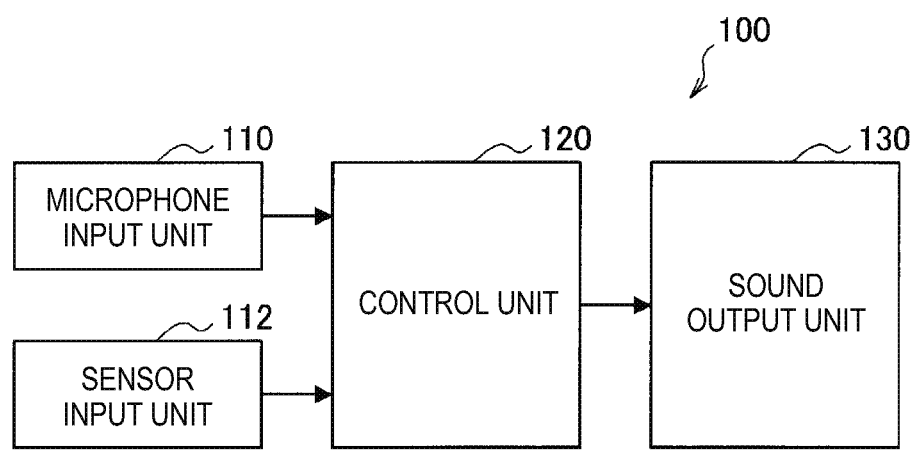
FIG. 4 is an explanatory diagram illustrating a second configuration example of a signal processing apparatus.

Subsequently, the second configuration example of the signal processing apparatus 100 according to the embodiment of the present disclosure will be described. FIG. 4 is an explanatory diagram illustrating the second configuration example of the signal processing apparatus 100 according to the embodiment of the present disclosure.

As illustrated in FIG. 4, the signal processing apparatus 100 according to the embodiment of the present disclosure includes the microphone input unit 110, a sensor input unit 112, the control unit 120, and the sound output unit 130.

Similarly to the microphone input unit 110 of the signal processing apparatus 100 that is illustrated in FIG. 2, the microphone input unit 110 acquires an aerodynamic sound generated by a motion of the portion, the tool, or the like to which the signal processing apparatus 100 is attached, and a sound generated by a human near the portion to which the apparatus is attached. The microphone input unit 110 outputs the acquired sound to the control unit 120 as a sound signal.

The sensor input unit 112 acquires a motion signal generated by a motion of the portion, the tool, or the like to which the signal processing apparatus 100 is attached. The motion signal is output from a motion sensor including an acceleration sensor, an angular velocity sensor, a geomagnetic sensor, and the like, for example. The motion sensor may be integrated with the signal processing apparatus 100, or may be a device separated from the signal processing apparatus 100. The sensor input unit 112 outputs the acquired motion signal to the control unit 120.

The control unit 120 performs signal processing for a sound signal output by the microphone input unit 110, as a waveform signal generated on the basis of a body motion of the user. As signal processing for a sound signal output by the microphone input unit 110, the control unit 120 performs, for example, amplification processing for at least a partial frequency band, predetermined effect processing, or the like. If the control unit 120 performs the signal processing on the sound signal output by the microphone input unit 110, the control unit 120 outputs a signal obtained after the signal processing, to the sound output unit 130.

Then, when performing the signal processing for the sound signal, the control unit 120 illustrated in FIG. 4 uses the motion signal supplied from the sensor input unit 112. For example, the control unit 120 changes a parameter of the signal processing for the sound signal, in accordance with content of the motion signal supplied from the sensor input unit 112. More specifically, in a case where a value of the motion signal is large, that is, an amount of a motion of the portion, the tool, or the like to which the signal processing apparatus 100 is attached is large, the control unit 120 may increase an amplification amount to be used when amplification processing for the sound signal is performed, or increase a change amount of the sound signal that is used in effect processing.

The control unit 120 may include a predetermined sound source thereinside. In addition, the control unit 120 may execute signal processing corresponding to a motion signal, by combining a sound signal generated on the basis of a body motion of the user that is output by the microphone input unit 110, and the sound source included inside.

Similarly to the sound output unit 130 of the signal processing apparatus 100 that is illustrated in FIG. 2, the sound output unit 130 includes, for example, a speaker, and outputs a sound that is based on a signal output from the control unit 120.

By having a configuration as illustrated in FIG. 4, the signal processing apparatus 100 according to the embodiment of the present disclosure can perform signal processing for a signal generated by a motion of the portion, the tool, or the like to which the apparatus is attached, to generate another signal, that is, a sound signal for exaggeratingly representing, by sound, a motion of the portion, the tool, or the like to which the apparatus is attached. By having a configuration as illustrated in FIG. 4, the signal processing apparatus 100 according to the embodiment of the present disclosure enables presentation to be performed so that a body motion itself can be aurally felt, by generating a sound signal for exaggeratingly representing, by sound, a motion of the portion, the tool, or the like to which the apparatus is attached.

In addition, by having a configuration as illustrated in FIG. 4, the signal processing apparatus 100 according to the embodiment of the present disclosure can change a parameter used in signal processing, in accordance with a motion of the portion, the tool, or the like to which the signal processing apparatus 100 is attached. Thus, by having a configuration as illustrated in FIG. 4, the signal processing apparatus 100 according to the embodiment of the present disclosure can change a sound to be output, in accordance with an amount of a motion, even in the same operation.

Figure 5:
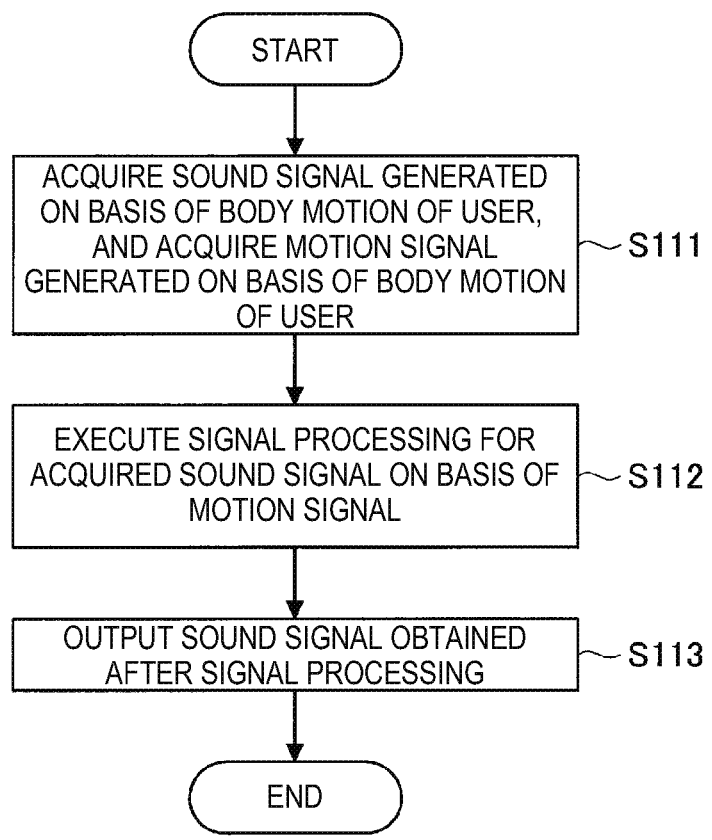
FIG. 5 is a flow chart illustrating a second operation example of the signal processing apparatus.

FIG. 5 is a flow chart illustrating the second operation example of the signal processing apparatus 100 according to the embodiment of the present disclosure.

The signal processing apparatus 100 acquires a sound signal generated on the basis of a body motion of the user, and acquires a motion signal generated on the basis of a body motion of the user (step S111). If the signal processing apparatus 100 acquires the sound signal generated on the basis of the body motion of the user, and the motion signal generated on the basis of the body motion of the user, the signal processing apparatus 100 subsequently executes signal processing for the acquired sound signal on the basis of content of the motion signal (step S112). The signal processing in step S112 is executed by the control unit 120. As signal processing executed in step S112, the control unit 120 performs, for example, amplification processing for at least a partial frequency band, predetermined effect processing, or the like.

For example, the signal processing apparatus 100 changes a parameter of the signal processing for the sound signal, in accordance with the content of the acquired motion signal. More specifically, in a case where a value of the motion signal is large, that is, an amount of a motion of the portion, the tool, or the like to which the signal processing apparatus 100 is attached is large, the signal processing apparatus 100 may increase an amplification amount to be used when amplification processing for the sound signal is performed, or increase a change amount of the sound signal that is used in effect processing.

If the signal processing apparatus 100 executes the signal processing for the sound signal, the signal processing apparatus 100 outputs a sound signal obtained after the signal processing has been executed (step S113). The sound signal obtained after the signal processing has been executed is output from the sound output unit 130 as a sound obtained by expanding a motion of the portion, the tool, or the like to which the signal processing apparatus 100 is attached.

By executing the operations as illustrated in FIG. 5, the signal processing apparatus 100 according to the embodiment of the present disclosure can perform signal processing for a signal generated by a motion of the portion, the tool, or the like to which the apparatus is attached, to generate another signal, that is, a sound signal for exaggeratingly representing, by sound, a motion of the portion, the tool, or the like to which the apparatus is attached. By executing the operations as illustrated in FIG. 5, the signal processing apparatus 100 according to the embodiment of the present disclosure enables presentation to be performed so that a body motion itself can be aurally felt, by generating a sound signal for exaggeratingly representing, by sound, a motion of the portion, the tool, or the like to which the apparatus is attached.

In addition, by executing the operations as illustrated in FIG. 5, the signal processing apparatus 100 according to the embodiment of the present disclosure can change a parameter used in signal processing, in accordance with a motion of the portion, the tool, or the like to which the signal processing apparatus 100 is attached. Thus, by executing the operations as illustrated in FIG. 5, the signal processing apparatus 100 according to the embodiment of the present disclosure can change a sound to be output, in accordance with an amount of a motion, even in the same operation.

1.4. Third Configuration Example and Operation Example

Subsequently, the third configuration example of the signal processing apparatus 100 according to the embodiment of the present disclosure will be described. In the first configuration example and the second configuration example of the signal processing apparatus 100, the microphone input unit 110 acquires an aerodynamic sound generated by a motion of the portion, the tool, or the like to which the signal processing apparatus 100 is attached, and a sound generated by a human near the portion to which the apparatus is attached. The third configuration example of the signal processing apparatus 100 performs signal processing for a motion signal generated on the basis of a body motion of the user, to generate a sound signal for exaggeratingly representing, by sound, a motion of the portion, the tool, or the like to which the apparatus is attached.

Figure 6:
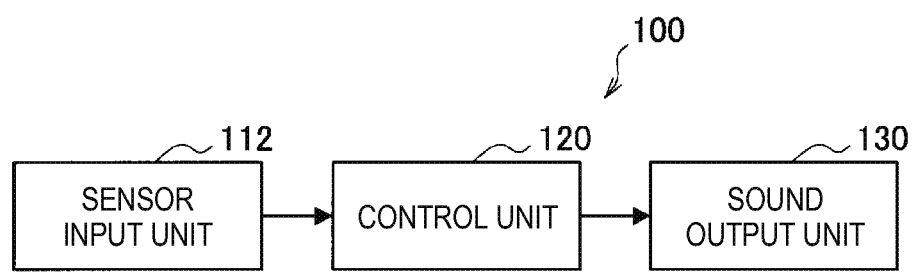
FIG. 6 is an explanatory diagram illustrating a third configuration example of a signal processing apparatus.

FIG. 6 is an explanatory diagram illustrating the third configuration example of the signal processing apparatus 100 according to the embodiment of the present disclosure. The signal processing apparatus 100 according to the embodiment of the present disclosure includes the sensor input unit 112, the control unit 120, and the sound output unit 130.

Similarly to the sensor input unit 112 illustrated in FIG. 4, the sensor input unit 112 acquires a motion signal generated by a motion of the portion, the tool, or the like to which the signal processing apparatus 100 is attached. The motion signal is output from a motion sensor including an acceleration sensor, an angular velocity sensor, a geomagnetic sensor, and the like, for example. The sensor input unit 112 outputs the acquired motion signal to the control unit 120.

The control unit 120 performs signal processing for the motion signal output by the sensor input unit 112, as a waveform signal generated on the basis of a body motion of the user. As signal processing for the motion signal output by the sensor input unit 112, the control unit 120 converts the motion signal output by the sensor input unit 112, into a sound signal, and performs, on the converted signal, for example, amplification processing for at least a partial frequency band, predetermined effect processing, or the like. If the control unit 120 performs the signal processing on the motion signal output by the sensor input unit 112, the control unit 120 outputs a signal obtained after the signal processing, to the sound output unit 130.

Similarly to the sound output unit 130 of the signal processing apparatus 100 that is illustrated in FIG. 2, the sound output unit 130 includes, for example, a speaker, and outputs a sound that is based on a signal output from the control unit 120.

By having a configuration as illustrated in FIG. 6, the signal processing apparatus 100 according to the embodiment of the present disclosure can perform signal processing for a motion signal generated by a motion of the portion, the tool, or the like to which the apparatus is attached, to generate another signal, that is, a sound signal for exaggeratingly representing, by sound, a motion of the portion, the tool, or the like to which the apparatus is attached. By having a configuration as illustrated in FIG. 6, the signal processing apparatus 100 according to the embodiment of the present disclosure enables presentation to be performed so that a body motion itself can be aurally felt, by generating a sound signal for exaggeratingly representing, by sound, a motion of the portion, the tool, or the like to which the apparatus is attached.

Figure 7:
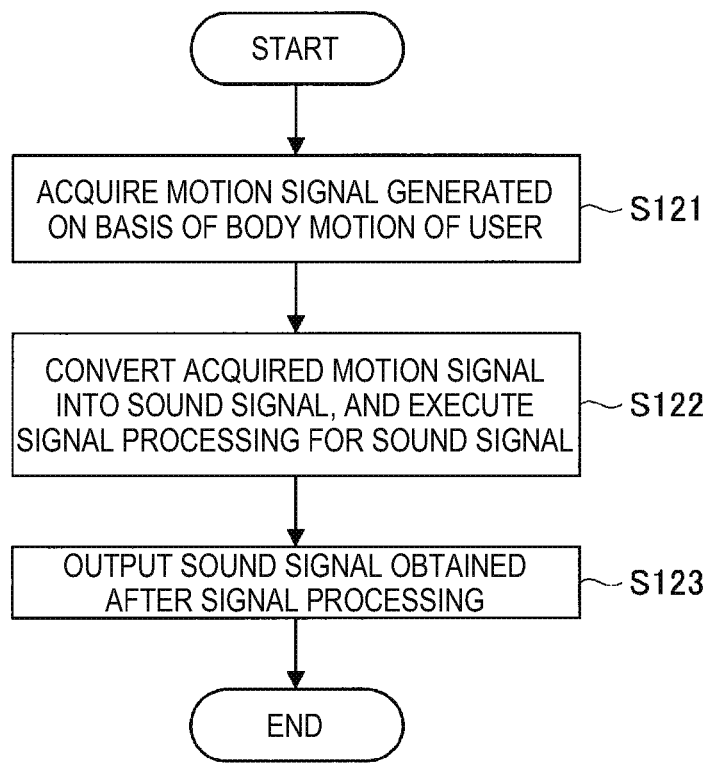
FIG. 7 is a flow chart illustrating a third operation example of the signal processing apparatus.

FIG. 7 is a flow chart illustrating the third operation example of the signal processing apparatus 100 according to the embodiment of the present disclosure.

The signal processing apparatus 100 acquires a motion signal generated on the basis of a body motion of the user (step S121). If the signal processing apparatus 100 acquires the motion signal generated on the basis of the body motion of the user, the signal processing apparatus 100 subsequently executes signal processing for the acquired motion signal (step S122). The signal processing in step S122 is executed by the control unit 120. As signal processing executed in step S122, the signal processing apparatus 100 performs, for example, amplification processing for at least a partial frequency band, predetermined effect processing, or the like, while regarding the motion signal as a sound signal.

If the signal processing apparatus 100 executes the signal processing for the sound signal, the signal processing apparatus 100 outputs a sound signal obtained after the signal processing has been executed (step S123). The sound signal obtained after the signal processing has been executed is output from the sound output unit 130 as a sound obtained by expanding a motion of the portion, the tool, or the like to which the signal processing apparatus 100 is attached.

By executing the operations as illustrated in FIG. 7, the signal processing apparatus 100 according to the embodiment of the present disclosure can perform signal processing for a motion signal generated by a motion of the portion, the tool, or the like to which the apparatus is attached, to generate another signal, that is, a sound signal for exaggeratingly representing, by sound, a motion of the portion, the tool, or the like to which the apparatus is attached. By executing the operations as illustrated in FIG. 7, the signal processing apparatus 100 according to the embodiment of the present disclosure enables presentation to be performed so that a body motion itself can be aurally felt, by generating a sound signal for exaggeratingly representing, by sound, a motion of the portion, the tool, or the like to which the apparatus is attached.

1.5. Fourth Configuration Example and Operation Example

Subsequently, the fourth configuration example of the signal processing apparatus 100 according to the embodiment of the present disclosure will be described. The third configuration example of the signal processing apparatus 100 performs signal processing for a motion signal generated on the basis of a body motion of the user, to generate a sound signal for exaggeratingly representing, by sound, a motion of the portion, the tool, or the like to which the apparatus is attached. In the fourth configuration example of the signal processing apparatus 100, a signal to be input is not a sound signal that is based on a sound collected by a microphone, but an audio signal such as music, and signal processing for the audio signal is performed.

Figure 8:
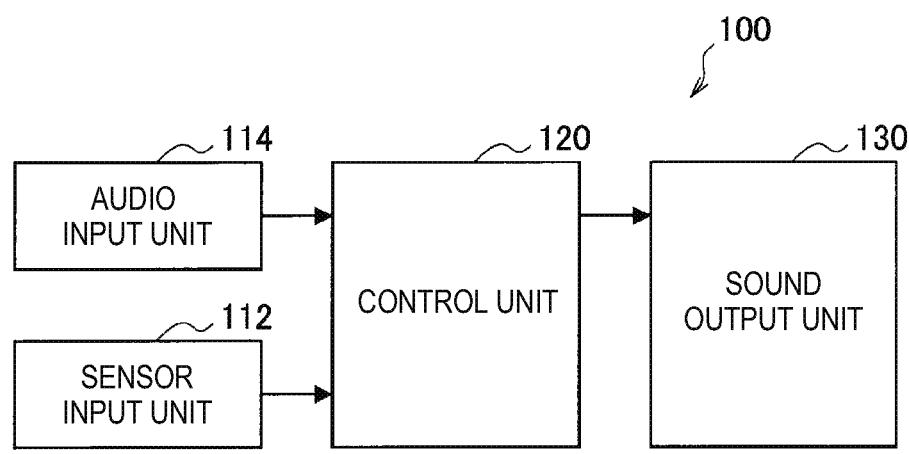
FIG. 8 is an explanatory diagram illustrating a fourth configuration example of a signal processing apparatus.

FIG. 8 is an explanatory diagram illustrating the fourth configuration example of the signal processing apparatus 100 according to the embodiment of the present disclosure. The signal processing apparatus 100 according to the embodiment of the present disclosure includes the sensor input unit 112, an audio input unit 114, the control unit 120, and the sound output unit 130.

Similarly to the sensor input unit 112 illustrated in FIGS. 4 and 6, the sensor input unit 112 acquires a motion signal generated by a motion of the portion, the tool, or the like to which the signal processing apparatus 100 is attached. The motion signal is output from a motion sensor including an acceleration sensor, an angular velocity sensor, a geomagnetic sensor, and the like, for example. The sensor input unit 112 outputs the acquired motion signal to the control unit 120.

The audio input unit 114 acquires an audio signal including music and the like. The audio signal can be supplied from, for example, an apparatus or service that is different from the signal processing apparatus 100 (portable music player, smartphone, tablet terminal, personal computer, music distribution service on a network, etc.). The audio input unit 114 outputs the acquired audio signal to the control unit 120.

The control unit 120 performs signal processing for the audio signal output by the audio input unit 114. As signal processing for the audio signal output by the audio input unit 114, the control unit 120 performs, for example, amplification processing for at least a partial frequency band, predetermined effect processing, or the like. If the control unit 120 performs the signal processing on the audio signal output by the audio input unit 114, the control unit 120 outputs a signal obtained after the signal processing, to the sound output unit 130.

Then, when performing the signal processing for the audio signal, the control unit 120 illustrated in FIG. 8 uses the motion signal supplied from the sensor input unit 112, as a waveform signal generated on the basis of a body motion of the user. For example, the control unit 120 changes a parameter of the signal processing for the audio signal, in accordance with content of the motion signal supplied from the sensor input unit 112. More specifically, in a case where a value of the motion signal is large, that is, an amount of a motion of the portion, the tool, or the like to which the signal processing apparatus 100 is attached is large, the control unit 120 may increase an amplification amount to be used when amplification processing for the audio signal is performed, or increase a change amount of the audio signal that is used in effect processing.

Similarly to the sound output unit 130 of the signal processing apparatus 100 that is illustrated in FIG. 2 or the like, the sound output unit 130 includes, for example, a speaker, and outputs a sound that is based on a signal output from the control unit 120.

By having a configuration as illustrated in FIG. 8, the signal processing apparatus 100 according to the embodiment of the present disclosure can perform signal processing for an audio signal, to generate another signal, that is, an audio signal changed in accordance with a motion of the portion, the tool, or the like to which the apparatus is attached. By having a configuration as illustrated in FIG. 8, the signal processing apparatus 100 according to the embodiment of the present disclosure enables presentation to be performed so that a body motion itself can be aurally felt, by generating an audio signal changed in accordance with a motion of the portion, the tool, or the like to which the apparatus is attached.

In addition, by having a configuration as illustrated in FIG. 8, the signal processing apparatus 100 according to the embodiment of the present disclosure can change a parameter used in signal processing, in accordance with a motion of the portion, the tool, or the like to which the signal processing apparatus 100 is attached. Thus, by having a configuration as illustrated in FIG. 8, the signal processing apparatus 100 according to the embodiment of the present disclosure can change a sound to be output, in accordance with an amount of a motion, even in the same operation.

Figure 9:
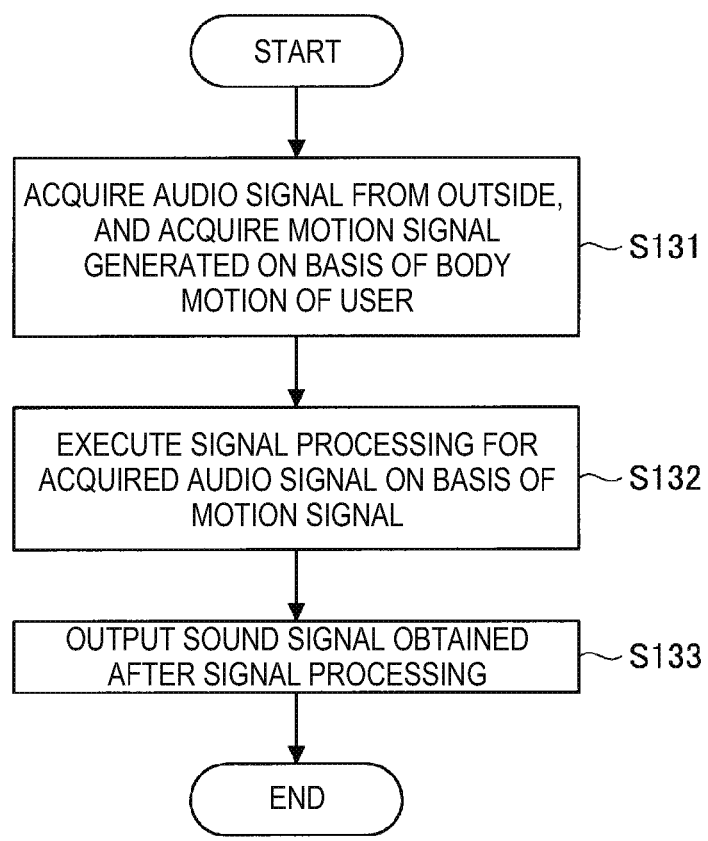
FIG. 9 is a flow chart illustrating a fourth operation example of the signal processing apparatus.

FIG. 9 is a flow chart illustrating the fourth operation example of the signal processing apparatus 100 according to the embodiment of the present disclosure.

The signal processing apparatus 100 acquires an audio signal, and acquires a motion signal generated on the basis of a body motion of the user (step S131). If the signal processing apparatus 100 acquires the audio signal and the motion signal generated on the basis of the body motion of the user, the signal processing apparatus 100 subsequently executes signal processing for the acquired audio signal on the basis of content of the motion signal (step S132). The signal processing in step S132 is executed by the control unit 120. As signal processing executed in step S132, the signal processing apparatus 100 performs, for example, amplification processing for at least a partial frequency band, predetermined effect processing, or the like.

For example, the signal processing apparatus 100 changes a parameter of the signal processing for the audio signal, in accordance with the content of the acquired motion signal. More specifically, in a case where a value of the motion signal is large, that is, an amount of a motion of the portion, the tool, or the like to which the signal processing apparatus 100 is attached is large, the signal processing apparatus 100 may increase an amplification amount to be used when amplification processing for the audio signal is performed, or increase a change amount of the audio signal that is used in effect processing.

If the signal processing apparatus 100 executes the signal processing for the audio signal, the signal processing apparatus 100 outputs an audio signal obtained after the signal processing has been executed (step S133). The audio signal obtained after the signal processing has been executed is output from the sound output unit 130 as a sound changed in accordance with a motion of the portion, the tool, or the like to which the signal processing apparatus 100 is attached.

By executing the operations as illustrated in FIG. 9, the signal processing apparatus 100 according to the embodiment of the present disclosure can perform signal processing for an audio signal, to generate another signal, that is, an audio signal changed in accordance with a motion of the portion, the tool, or the like to which the apparatus is attached. By executing the operations as illustrated in FIG. 9, the signal processing apparatus 100 according to the embodiment of the present disclosure enables presentation to be performed so that a body motion itself can be aurally felt, by generating an audio signal changed in accordance with a motion of the portion, the tool, or the like to which the apparatus is attached.

In addition, by executing the operations as illustrated in FIG. 9, the signal processing apparatus 100 according to the embodiment of the present disclosure can change a parameter used in signal processing, in accordance with a motion of the portion, the tool, or the like to which the signal processing apparatus 100 is attached. Thus, by executing the operations as illustrated in FIG. 9, the signal processing apparatus 100 according to the embodiment of the present disclosure can change a sound to be output, in accordance with an amount of a motion, even in the same operation.

1.6. Fifth Configuration Example and Operation Example

Subsequently, the fifth configuration example of the signal processing apparatus 100 according to the embodiment of the present disclosure will be described. In the fourth configuration example of the signal processing apparatus 100, a signal to be input is not a sound signal that is based on a sound collected by a microphone, but an audio signal such as music, and signal processing for the audio signal is performed. The fifth configuration example of the signal processing apparatus 100 performs synthesis processing of a sound signal that is based on a sound collected by a microphone, and an audio signal such as music, in accordance with a motion of the portion, the tool, or the like to which the signal processing apparatus 100 is attached.

Figure 10:
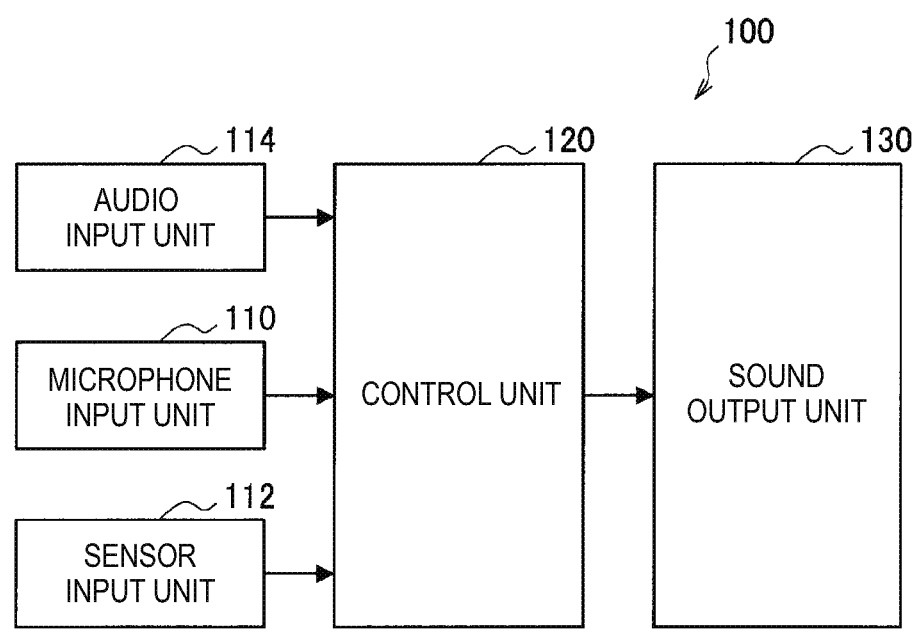
FIG. 10 is an explanatory diagram illustrating a fifth configuration example of a signal processing apparatus.

FIG. 10 is an explanatory diagram illustrating the fifth configuration example of the signal processing apparatus 100 according to the embodiment of the present disclosure. The signal processing apparatus 100 according to the embodiment of the present disclosure includes the microphone input unit 110, the sensor input unit 112, the audio input unit 114, the control unit 120, and the sound output unit 130.

Similarly to the microphone input unit 110 of the signal processing apparatus 100 that is illustrated in FIG. 2 or the like, the microphone input unit 110 acquires an aerodynamic sound generated by a motion of the portion, the tool, or the like to which the signal processing apparatus 100 is attached, and a sound generated by a human near the portion to which the apparatus is attached. The microphone input unit 110 outputs the acquired sound to the control unit 120 as a sound signal.

Similarly to the sensor input unit 112 illustrated in FIG. 4 or the like, the sensor input unit 112 acquires a motion signal generated by a motion of the portion, the tool, or the like to which the signal processing apparatus 100 is attached. The motion signal is output from a motion sensor including an acceleration sensor, an angular velocity sensor, a geomagnetic sensor, and the like, for example. The sensor input unit 112 outputs the acquired motion signal to the control unit 120.

Similarly to the audio input unit 114 illustrated in FIG. 8, the audio input unit 114 acquires an audio signal including music and the like. The audio signal can be supplied from, for example, an apparatus or service that is different from the signal processing apparatus 100 (portable music player, smartphone, tablet terminal, personal computer, music distribution service on a network, etc.). The audio input unit 114 outputs the acquired audio signal to the control unit 120.

The control unit 120 performs signal processing for at least any of the sound signal output by the microphone input unit 110, the motion signal output by the sensor input unit 112, and the audio signal output by the audio input unit 114. As signal processing for the sound signal output by the microphone input unit 110, the motion signal output by the sensor input unit 112, and the audio signal output by the audio input unit 114, the control unit 120 performs, for example, amplification processing for at least a partial frequency band, predetermined effect processing, or the like. If the control unit 120 performs signal processing on at least any of the sound signal output by the microphone input unit 110, the motion signal output by the sensor input unit 112, and the audio signal output by the audio input unit 114, the control unit 120 outputs a signal obtained after the signal processing, to the sound output unit 130.

For example, the control unit 120 performs similar amplification processing, predetermined effect processing, or the like on both of the sound signal output by the microphone input unit 110, and the audio signal output by the audio input unit 114, in accordance with the motion signal output by the sensor input unit 112. If the control unit 120 performs the processing on both of the audio signal output by the audio input unit 114, the control unit 120 synthesizes signals obtained after the processing, and outputs the resultant signal to the sound output unit 130.

In addition, for example, the control unit 120 performs similar amplification processing, predetermined effect processing, or the like, on either one of the sound signal output by the microphone input unit 110, and the audio signal output by the audio input unit 114, in accordance with the motion signal output by the sensor input unit 112.

In addition, for example, the control unit 120 may change a parameter of the amplification processing, the predetermined effect processing, or the like that is for the audio signal output by the audio input unit 114, in accordance with a waveform of the sound signal output by the microphone input unit 110.

Similarly to the sound output unit 130 of the signal processing apparatus 100 that is illustrated in FIG. 2 or the like, the sound output unit 130 includes, for example, a speaker, and outputs a sound that is based on a signal output from the control unit 120.

By having a configuration as illustrated in FIG. 10, the signal processing apparatus 100 according to the embodiment of the present disclosure can perform signal processing for at least any of a sound signal output by the microphone input unit 110, a motion signal output by the sensor input unit 112, and an audio signal output by the audio input unit 114, to generate another signal, that is, a sound signal changed in accordance with a motion of the portion, the tool, or the like to which the apparatus is attached. By having a configuration as illustrated in FIG. 10, the signal processing apparatus 100 according to the embodiment of the present disclosure enables presentation to be performed so that a body motion itself can be aurally felt, by generating a sound signal changed in accordance with a motion of the portion, the tool, or the like to which the apparatus is attached.

When performing signal processing for a sound signal or an audio signal, the control unit 120 in each of the aforementioned configuration examples may perform tone processing in accordance with a jump degree of a motion of a user or a tool to which the signal processing apparatus 100 is attached. More specifically, the control unit 120 uses, as a coefficient for performing the tone processing, a value obtained by subtracting a differential value of acceleration (current acceleration−previous acceleration) from a current acceleration value.

By using a value obtained by subtracting a differential value of acceleration (current acceleration−previous acceleration) from a current acceleration value, as a coefficient for performing the tone processing, the control unit 120 can represent contrast of changes in sound when the user rapidly stops a motion or moves. For example, in a case where the user is dancing, if the user stops the motion, the control unit 120 can instantaneously stop an effective effect. In addition, similarly, in a case where the user is dancing, the control unit 120 can cause an effective effect to follow the motion of the user.

In addition, when the signal processing apparatus 100 according to the embodiment of the present disclosure outputs an audio signal, the control unit 120 may apply an effective effect to the audio signal on the basis of a value obtained by subtracting a differential value of acceleration.

For example, when the signal processing apparatus 100 outputs an audio signal, in a case where the user slowly moves or stops a motion, an effective effect to be applied to the audio signal is weakened because a value obtained by subtracting a differential value of acceleration is small. In contrast, in a case where the user rapidly stops a motion or moves, an effective effect to be applied to the audio signal is strengthened because a value obtained by subtracting a differential value of acceleration is large. In other words, if the user rapidly stops a motion or moves, the control unit 120 can apply contrast to an audio signal to be output.

An audio signal output by the signal processing apparatus 100 may be the one supplied from the outside, or may be a sound prerecorded by a microphone 102 or the like, such as a sound of human voice or music, for example. By applying an effect to a sound prerecorded by the microphone 102 or the like, the control unit 120 can apply contrast to a sound recorded on the spot.

In addition, the control unit 120 may perform signal processing corresponding to rotation of an attachment portion of a user or a tool. For example, in a case where the signal processing apparatus 100 is attached to an arm, a leg, or a tool, the control unit 120 may apply a bandpass, lowpass or highpass filter in accordance with a rotation angle of an attachment portion. In addition, for example, in a case where the signal processing apparatus 100 is attached to an arm, a leg, or a tool in a similar manner, the control unit 120 may add an effect such as a pitch shift, in accordance with a rotation angle of an attachment portion.

In addition, the control unit 120 may perform signal processing corresponding to a state of acceleration of a motion of an attachment portion of a user or a tool. The control unit 120 may strengthen tone processing in proportion to a degree of acceleration of an attachment portion of a user or a tool.

1.7. External Appearance Example

Subsequently, an external appearance example of the signal processing apparatus 100 according to the embodiment of the present disclosure will be described.

FIGS. 11 and 12 are explanatory diagrams each illustrating an external appearance example of the signal processing apparatus 100 according to the embodiment of the present disclosure. The signal processing apparatus 100 illustrated in FIG. 11 or 12 is configured to be attached to a band 200 for attaching to an arm of a user.

The signal processing apparatus 100 illustrated in FIG. 11 or 12 includes the microphone input unit 110 that acquires an aerodynamic sound generated by a motion of the portion, the tool, or the like to which the signal processing apparatus 100 is attached, and a sound generated by a human near the portion to which the apparatus is attached, the control unit 120 that performs signal processing for the collected sound, and the sound output unit 130 that outputs a sound on the basis of a signal obtained after the control unit 120 has performed the signal processing.

The signal processing apparatus 100 may output a sound that is based on a signal obtained after the control unit 120 has performed the signal processing, not from the signal processing apparatus 100 but from an external speaker. The external speaker may be connected to the signal processing apparatus 100 in a wired manner, or may be wirelessly connected thereto. In addition, the signal processing apparatus 100 may output a sound that is based on a signal obtained after the control unit 120 has performed the signal processing, from an external speaker in addition to from the signal processing apparatus 100.

By enabling a sound that is based on a signal obtained after the control unit 120 has performed the signal processing, to be output from an external speaker in addition to from the signal processing apparatus 100, the signal processing apparatus 100 can output a sound from a main body of the signal processing apparatus 100 or output a sound from the external speaker, in accordance with a usage scene.

For example, in an environment in which a sound cannot be output, the signal processing apparatus 100 can output a sound obtained after signal processing, to headphones or earphones, so as to enable only the user to hear. In addition, in a case where a sound is desired to be felt more, the signal processing apparatus 100 can output a sound obtained after signal processing, from the main body. In addition, in a case where all the people including surrounding people are exciting, or a motion of the user is to be shown up, the signal processing apparatus 100 can output a sound obtained after signal processing, from an external speaker.

Figure 13A:
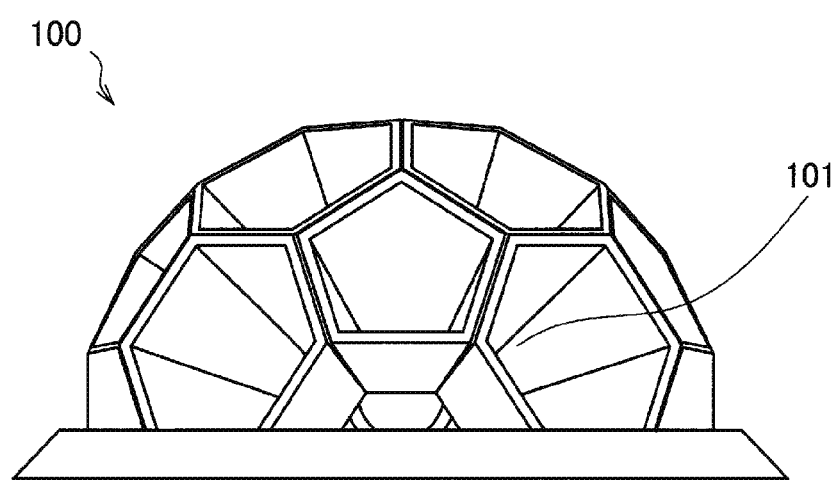
FIG. 13A is an explanatory diagram illustrating an external appearance example of a signal processing apparatus.
Figure 13B:
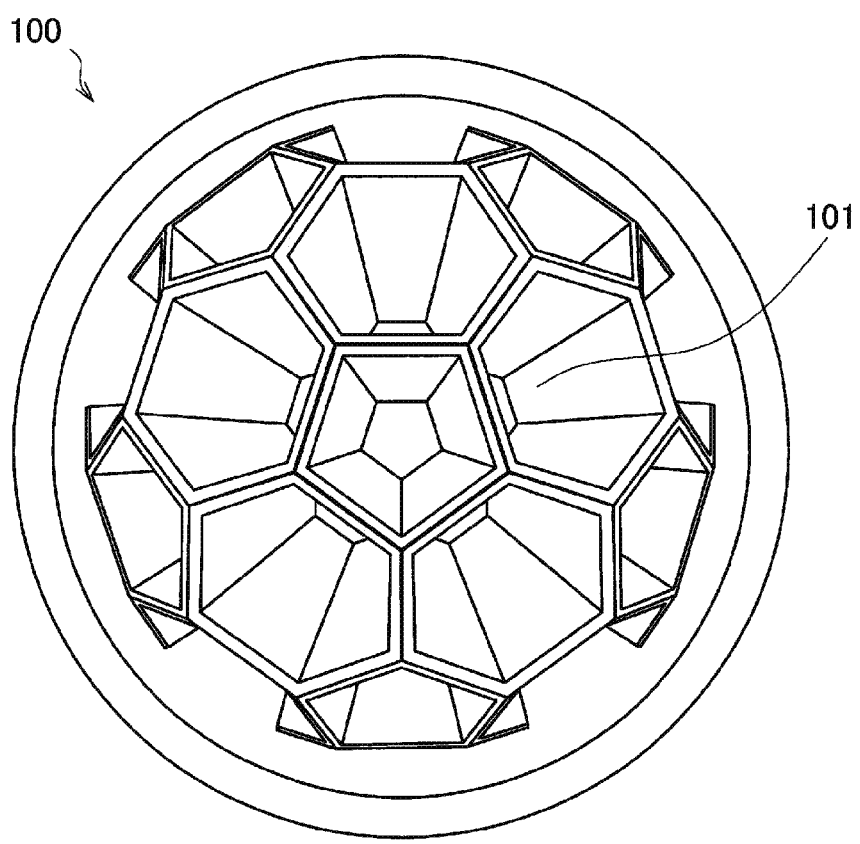
FIG. 13B is an explanatory diagram illustrating an external appearance example of a signal processing apparatus.
Figure 13C:
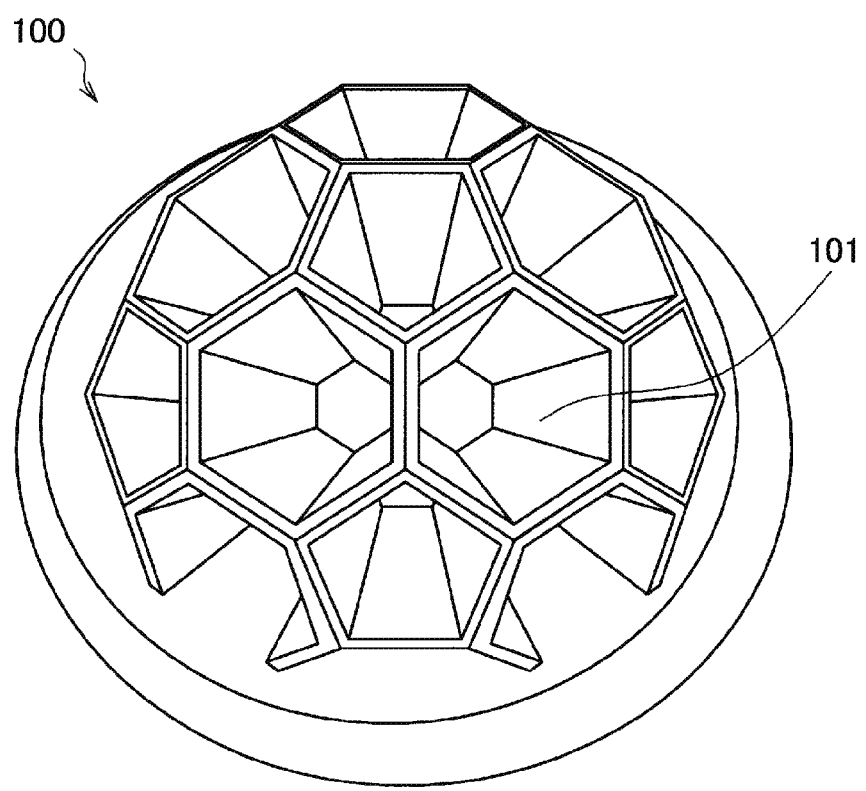
FIG. 13C is an explanatory diagram illustrating an external appearance example of a signal processing apparatus.
Figure 14:
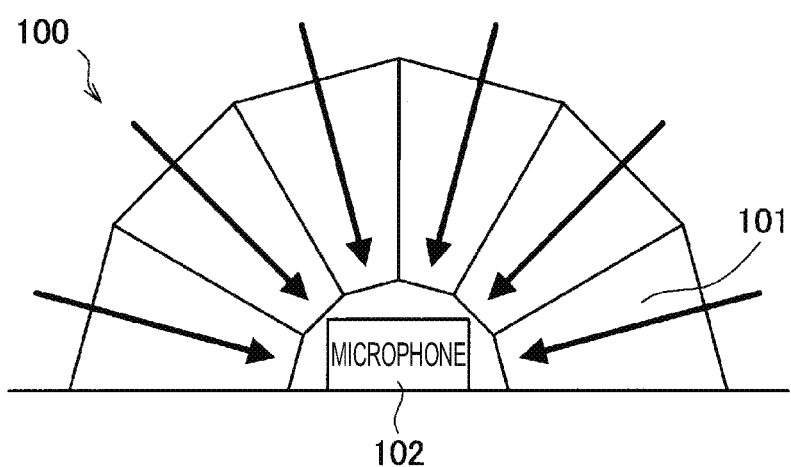
FIG. 14 is an explanatory diagram schematically illustrating an effect of putting a semispherical honeycomb case on a microphone.

FIGS. 13A, 13B, and 13C are explanatory diagrams illustrating an external appearance example of the signal processing apparatus 100. In the signal processing apparatus 100, a semispherical case 101 having honeycomb holes is put on so as to cover the microphone 102 that collects an aerodynamic sound. In this manner, by putting on the semispherical honeycomb case 101 so as to cover the microphone 102 that collects an aerodynamic sound, it becomes easier for the microphone 102 to collect sounds from all directions. In addition, density of sounds to be collected becomes higher toward a center portion of the case 101. FIG. 14 is an explanatory diagram schematically illustrating an effect of putting on the semispherical honeycomb case 101 so as to cover the microphone 102 that collects an aerodynamic sound.

It should be appreciated that an external appearance of the signal processing apparatus 100 is not limited to this example. As illustrated in FIG. 12, by putting on a case having holes around a microphone, sounds from all directions in 360 degrees around the microphone may be collected.

The signal processing apparatus 100 may be configured to be detachable with respect to the band 200 illustrated in FIG. 11 or 12. Furthermore, the signal processing apparatus 100 may have a configuration in which a case to be put on a microphone is also detachable. For example, in a case where sounds are collected from all directions, and the collected sounds are desired to be expanded, the case 101 as illustrated in FIGS. 13A, 13B, and 13C may be attached to the signal processing apparatus 100. In addition, in a case where sounds are collected only from a constant direction, and the collected sounds are desired to be expanded, a case formed so as to have such directionality that only sounds in the direction are easily collected may be attached to the signal processing apparatus 100.

The aforementioned signal processing apparatus 100 may be attached to or incorporated in a tool or a toy used by the user. By incorporating the signal processing apparatus 100 in a tool or a toy, not only a motion of a body of a human but also a motion of the tool or the toy can be expanded by sound. For example, the signal processing apparatus 100 may be incorporated in a ball, shoes, or a sporting tool. By incorporating the signal processing apparatus 100 in a ball, shoes, or a sporting tool, not only a motion of a body but also a motion of a ball separated from the body, and the like are expanded by sound. In addition, by incorporating the signal processing apparatus 100 in a toy or the like, a motion of the toy (toy vehicle, doll, drone) or the like is expanded by sound.

1.8. Application Example

The aforementioned signal processing apparatus 100 may transmit to another apparatus, record, or reproduce not only a sound generated by a body movement, but also tactile sensation.

Figure 15:
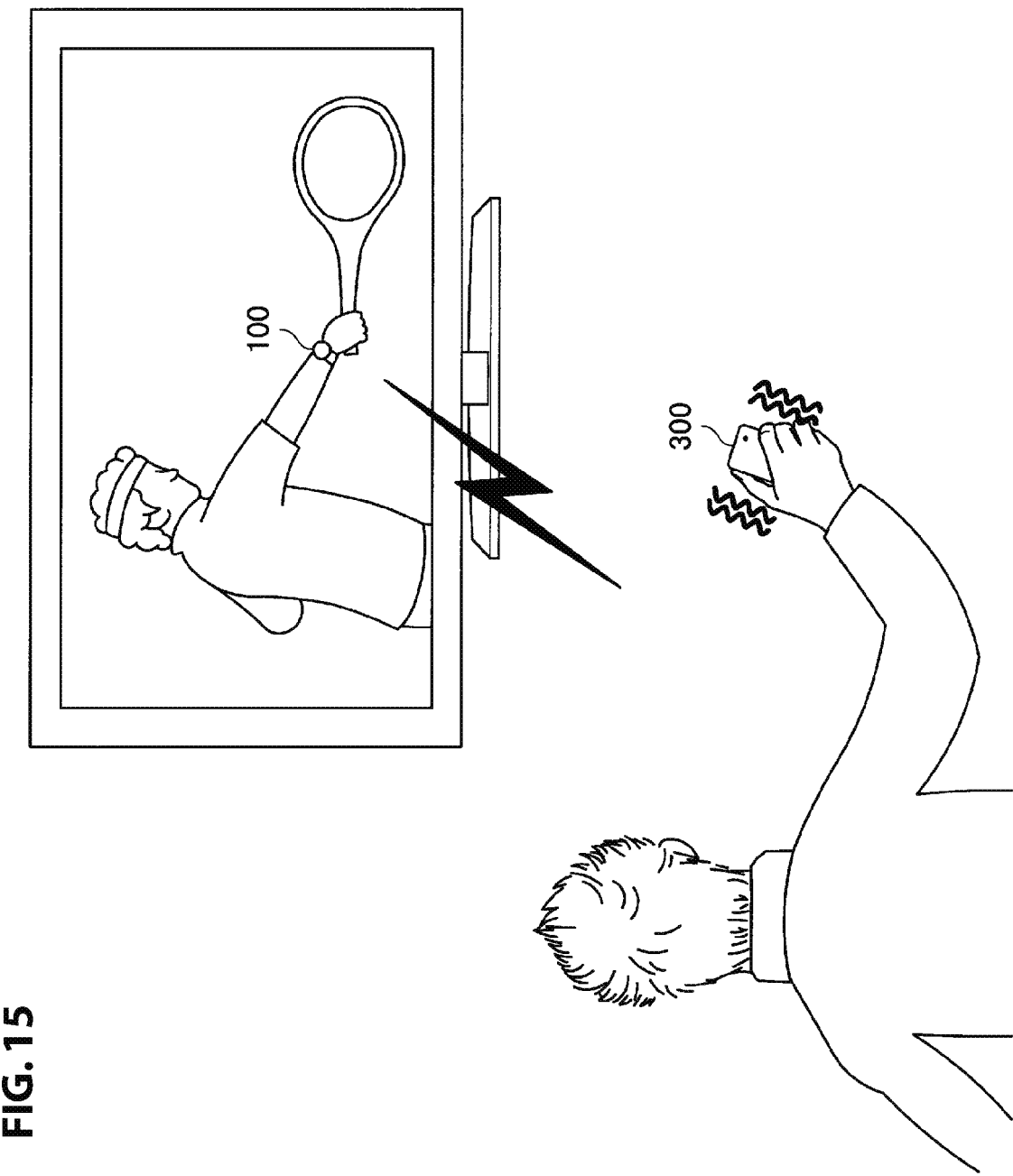
FIG. 15 is an explanatory diagram illustrating an application example of a signal processing apparatus.

FIG. 15 is an explanatory diagram illustrating an application example of the signal processing apparatus 100 according to the embodiment of the present disclosure. The signal processing apparatus 100 may record a sound and tactile sensation (sound transmitted in a substance) that are generated by a body movement of a user wearing the signal processing apparatus 100, and transmit the sound and tactile sensation to another apparatus. The sound and tactile sensation that have been recorded and transmitted by the signal processing apparatus 100 are reproduced by another apparatus.

The signal processing apparatus 100 transmits a sound and tactile sensation that are generated by a body movement of the user wearing the signal processing apparatus 100, to another apparatus wirelessly for example. In addition, the signal processing apparatus 100 records a sound and tactile sensation that are generated by a body movement of the user wearing the signal processing apparatus 100, in a predetermined sound file format, for example.

By transmitting a sound and tactile sensation that are generated by a body movement of the user wearing the signal processing apparatus 100, to another apparatus in this manner, a movement experience of another person can be felt. In addition, by recording a sound and tactile sensation that are generated by a body movement of the user wearing the signal processing apparatus 100, and reproducing the sound and tactile sensation afterward, the signal processing apparatus 100 can cause the user to relive the past movement experience of the user.

More specifically, the signal processing apparatus 100 may transmit a sound and tactile sensation that are generated by a body movement of the user wearing the signal processing apparatus 100, to another apparatus simultaneously with a broadcast wave video or a network content video. By transmitting the sound and tactile sensation to another apparatus simultaneously with the broadcast wave video or the network content video, the signal processing apparatus 100 can cause a user that uses the apparatus, to feel a body movement of the user wearing the signal processing apparatus 100, while viewing the video of the user wearing the signal processing apparatus 100.

The signal processing apparatus 100 may have such a structure that a microphone is closely attached to a body portion, for example, for transmitting tactile sensation of a user. By having such a structure that a microphone is closely attached to a body portion, the signal processing apparatus 100 can input an oscillatory waveform having passed through the body or a substance, and detect the oscillatory waveform as tactile sensation. In addition, the signal processing apparatus 100 may input an oscillatory waveform having passed through the body or a substance, using an oscillation sensor in addition to the microphone.

An apparatus that reproduces a sound and tactile sensation that have been recorded by the signal processing apparatus 100 can include, for example, an oscillation actuator, a speaker, a motion sensor, and the like. Examples of the apparatus having these modules can include a smartphone, a smartphone case including these modules, and the like.

For example, an apparatus that reproduces a sound and tactile sensation that have been recorded by the signal processing apparatus 100 may reproduce all sounds and tactile sensations, or may perform motion detection of a user that uses the above-described apparatus, and reproduce a sound and tactile sensation that are generated by a body of a transmitter, only in a case where the user performs the same motion as a motion of the transmitter.

By performing tone processing on a sound and tactile sensation that are generated by a body movement of the user wearing the signal processing apparatus 100, the signal processing apparatus 100 can present the sound and the tactile sensation in an expanded manner. For example, by performing tone processing on the collected sound and tactile sensation, and reproducing the resultant sound and tactile sensation using a speaker and an oscillation actuator, the signal processing apparatus 100 can cause such a sensation that a property of a substance changes.

2. Conclusion

As described above, according to the embodiment of the present disclosure, the signal processing apparatus 100 that performs signal processing for a signal generated by a motion of the portion, the tool, or the like to which the apparatus is attached, to generate another signal, that is, a sound signal for exaggeratingly representing, by sound, a motion of the portion, the tool, or the like to which the apparatus is attached is provided. The signal processing apparatus 100 according to the embodiment of the present disclosure enables presentation to be performed so that a body motion itself can be aurally felt, by generating a sound signal for exaggeratingly representing, by sound, a motion of the portion, the tool, or the like to which the apparatus is attached.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

In addition, some or all of the functional blocks shown in the functional block diagrams used in the above description may be implemented by a server device that is connected via a network, for example, the Internet. In addition, configurations of the functional blocks shown in the functional block diagrams used in the above description may be implemented in a single device or may be implemented in a system in which a plurality of devices cooperate with one another. The system in which a plurality of devices cooperate with one another may include, for example, a combination of a plurality of server devices and a combination of a server device and a terminal device.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the signal processing apparatus 100 according to the embodiment of the present disclosure performs signal processing for a signal generated by a motion of the portion, the tool, or the like to which the apparatus is attached, to output a sound for representing a motion of a body in an expanded manner. Aside from the foregoing, for example, by interlocking with an imaging apparatus such as a mobile camera, video processing as in animation may be performed in real time, and a video that releases a sound as in an animation world may be generated.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A signal processing apparatus including:

a control unit configured to execute, on a basis of a waveform signal generated in accordance with a motion of an attachment portion of a sensor attached to a tool or a body, effect processing for the waveform signal or another waveform signal, the waveform signal being output from the sensor.

(2)

The signal processing apparatus according to (1), in which the waveform signal is a sound signal collected by the sensor.

(3)

The signal processing apparatus according to (1), in which, in a case where the waveform signal is not a sound signal, the control unit converts the waveform signal into a sound signal, and then executes the effect processing.

(4)

The signal processing apparatus according to (1), in which the waveform signal is a signal that is based on a motion amount detected by the sensor.

(5)

The signal processing apparatus according to (1), in which the control unit executes effect processing that is based on the waveform signal, on a signal obtained by synthesizing a sound signal from a predetermined sound source, and the another waveform signal.

(6)

The signal processing apparatus according to any of (1) to (5), in which the control unit synthesizes the waveform signal and the another waveform signal that are obtained after effect processing.

(7)

The signal processing apparatus according to any of (1) to (6), in which the control unit executes, as the effect processing, processing including amplification processing for at least a partial frequency band.

(8)

The signal processing apparatus according to any of (1) to (7), in which the control unit executes, as the effect processing, processing including echo processing for at least a partial frequency band.

(9)

The signal processing apparatus according to any of (1) to (8), in which the control unit executes, as the effect processing, processing including pitch shift processing.

(10)

The signal processing apparatus according to any of (1) to (9), in which the control unit changes a detail of the effect processing in accordance with content of the waveform signal.

(11)

The signal processing apparatus according to any of (1) to (10) in which the control unit changes a detail of the effect processing in accordance with an instruction issued by a user.

(12)

The signal processing apparatus according to any of (1) to (11), including:

a semispherical case having honeycomb holes, the semispherical case covering a sensor that outputs the waveform signal.

(13)

The signal processing apparatus according to (12), in which holes of the case become smaller toward a center.

(14)

A signal processing method including:

executing, by a processor, on a basis of a waveform signal generated in accordance with a motion of an attachment portion of a sensor attached to a tool or a body, effect processing for the waveform signal or another waveform signal, the waveform signal being output from the sensor.

(15)

A computer program for causing a computer to execute:

executing, on a basis of a waveform signal generated in accordance with a motion of an attachment portion of a sensor attached to a tool or a body, effect processing for the waveform signal or another waveform signal, the waveform signal being output from the sensor.

REFERENCE SIGNS LIST 1 user
100 signal processing apparatus
101 case
102 microphone
110 microphone input unit
112 sensor input unit
114 audio input unit
120 control unit
130 sound output unit
200 band

What is claimed is:

1. A signal processing apparatus, comprising:
a first sensor attached to one of a tool or a body, wherein the first sensor is a microphone, and the first sensor is configured to:
capture an aerodynamic sound of a motion of the first sensor; and
output a first sound signal based on the captured aerodynamic sound; and
a case having honeycomb holes, wherein
a shape of the case is semispherical, and
the case covers the first sensor.

2. The signal processing apparatus according to claim 1, further comprising a second sensor attached to one of the tool or the body, wherein
the second sensor is configured to output a motion signal, and the motion signal is output based on a motion of an attachment portion of the second sensor.

3. The signal processing apparatus according to claim 2, further comprising:
circuitry configured to:
execute an effect processing operation on the first sound signal based on the motion signal output by the second sensor; and
generate a second sound signal based on the execution of the effect processing operation on the first sound signal, wherein
the generated second sound signal is an audio representation of the motion of the attachment portion of the second sensor; and
a speaker configured to output the second sound signal, wherein
the outputted second sound signal corresponds to the captured aerodynamic sound.

4. The signal processing apparatus according to claim 3, wherein
the circuitry is further configured to:
synthesize a third sound signal based on a sound source and the first sound signal;
obtain a signal based on the synthesized third sound signal; and
execute the effect processing operation on the obtained signal based on the motion signal.

5. The signal processing apparatus according to claim 3, wherein
the circuitry is further configured to execute, as the effect processing operation, an echo processing operation for at least a partial frequency band of the first sound signal.

6. The signal processing apparatus according to claim 3, wherein
the circuitry is further configured to execute, as the effect processing operation, a pitch shift processing operation.

7. The signal processing apparatus according to claim 3, wherein
the circuitry is further configured to change a detail of the effect processing operation based on a user instruction.

8. The signal processing apparatus according to claim 3, wherein
the circuitry is further configured to execute, as the effect processing operation, an amplification processing operation for at least a partial frequency band of the first sound signal.

9. The signal processing apparatus according to claim 3, further comprising an audio device configured to output an audio signal, wherein
the circuitry is further configured to:
execute, based on the motion signal, the effect processing operation for the first sound signal and the audio signal; and
synthesize the first sound signal and the audio signal to generate a resultant signal.

10. The signal processing apparatus according to claim 1, wherein
the honeycomb holes of the case become smaller toward a center of the case.

11. A signal processing method, comprising:
in a signal processing apparatus:
capturing, by a sensor of the signal processing apparatus, an aerodynamic sound of a motion of the sensor, wherein the sensor is attached to one of a tool or a body, and the sensor is a microphone; and
outputting, by the sensor, a sound signal based on the captured aerodynamic sound, wherein
a case of the signal processing apparatus covers the sensor,
a shape of the case is semispherical, and
the case has honeycomb holes.

12. An apparatus, comprising:
first circuitry configured to:
receive, from a signal processing apparatus, a first sound signal, wherein
the signal processing apparatus comprises a first sensor, second circuitry, and a case,
the first sensor is a microphone,
the first sensor captures an aerodynamic sound of a motion of the first sensor,
the first sensor outputs a second sound signal based on the captured aerodynamic sound,
the case covers the first sensor,
a shape of the case is semispherical,
the case has honeycomb holes,
the second circuitry executes an effect processing operation on the second sound signal,
the second circuitry generates the first sound signal based on the execution of the effect processing operation on the second sound signal, and
the first sound signal corresponds to the captured aerodynamic sound; and
reproduce the received first sound signal.

13. The apparatus according to claim 12, wherein
the signal processing apparatus further comprises a second sensor,
the second sensor outputs a motion signal,
the second circuitry receives the motion signal which is output by the second sensor of the signal processing apparatus and
the second circuitry executes the effect processing operation on the second sound signal based on the received motion signal.

14. The apparatus according to claim 12, wherein
the second circuitry executes, as the effect processing operation, a pitch shift processing operation.

15. The apparatus according to claim 12, wherein
the second circuitry changes a detail of the effect processing operation based on a user instruction.

16. The apparatus according to claim 12, wherein
the second circuitry executes, as the effect processing operation, an amplification processing operation for at least a partial frequency band of the second sound signal.

* * * * *